UNITED STATES PATENT OFFICE.

JOSEPH TURNER AND HARRY DEAN, OF HUDDERSFIELD, ENGLAND, ASSIGNORS TO READ HOLLIDAY & SONS, LTD., OF TURNBRIDGE, HUDDERSFIELD, ENGLAND.

SUBSTANTIVE DYESTUFFS.

1,099,676.  Specification of Letters Patent.  Patented June 9, 1914.

No Drawing.  Application filed April 25, 1913.  Serial No. 763,570.

*To all whom it may concern:*

Be it known that we, JOSEPH TURNER and HARRY DEAN, subjects of King George V of Great Britain, and residents of Huddersfield, in the county of York, England, have invented certain new and useful Improvements in Substantive Dyestuffs, of which the following is a specification.

We have discovered that new and useful direct dyeing cotton colors can be produced by combining the intermediate products from tetrazotized diamins and salicylic acid with a naphthylamin-sulfonic acid, diazotizing the thus produced compound and combining it with an amino-naphthol-sulfonic acid, which dyestuffs most probably have the following general formula:

S.N:N.P.N:N.A.N:N.B in which S represents a radical of an alkali salt of salicylic acid, P represents a diaryl radical of a para-diamin, A represents an alkali salt of naphthalene-sulfonic acid radical, and B represents an alkali salt of 2-amino-naphthol-sulfonic acid radical.

By tetrazotized diamins we mean the compounds produced by tetrazotizing para-diamins such as benzidin, tolidin and dianisidin. By naphthylamin-sulfonic acids we mean alpha-naphthylamin-mono-sulfonic acids 1:6 and 1:7. By amino-naphthol-sulfonic acid we mean amino-naphthol-sulfonic acid $G(NH_2:OH:SO_3H—2:8:6)$ and amino-naphthol-sulfonic acid $J(NH_2:OH:SO_3H—2:5:7)$.

The following is an example of one method of following our invention: 18.4 grams of benzidin are tetrazotized in the usual manner by means of 14 grams sodium nitrite and 54 grams hydrochloric acid 21° Bé. and an aqueous solution of 14.5 grams salicylic acid and 45 grams sodium carbonate is added with constant stirring. When the combination is complete, an aqueous solution of 24.5 grams of the sodium salt of alpha-naphthylamin-sulfonic acid-1:6 is added and stirred. When the naphthylamin-sulfonic acid has completely combined with the intermediate compound, the thus produced orange dyestuff is carefully neutralized with hydrochloric acid and again diazotized by means of 7 grams sodium nitrite. When the diazotation is complete, which usually takes from two to three hours, the deep brown diazo body thus formed is combined with 23.9 grams of amino-naphthol-sulfonic acid G in an alkaline solution. The thus produced dyestuff, dyes unmordanted vegetable fibers a fast drab to bronze shade, depending upon the amount of dyestuff employed, and has most probably the following formula:—

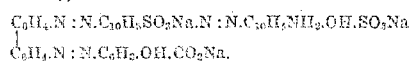

By substituting amino-naphthol-sulfonic acid J for the amino-naphthol-sulfonic acid G, in the above example, shades of a redder tone are obtained.

We do not limit ourselves to the exact quantities, times of reaction or particular materials mentioned above, as our invention comprises diazotizing the compound formed from one molecule of tetrazotized para-diamin, one molecule of salicylic acid and one molecule of naphthylamin-sulfonic acid, and combining the diazotized compound thus formed with one molecule of amino-naphthol-sulfonic acid and the dyestuffs thus produced.

Having thus described our invention, what we claim is:

1. The dyestuffs produced by combining the intermediate product from one molecule of a tetrazotized para-diamin and one molecule of salicylic acid with one molecule of alpha-naphthylamin-sulfonic acid, diazotizing the resulting product and combining it with one molecule of 2-amino-naphthol-sulfonic acid, and which dyestuffs have most probably the formula:—

S.N:N.P.N:N.A.N:N.B in which S represents a radical of an alkali salt of salicylic acid, P represents a diaryl radical of a para-diamin, A represents an alkali salt of naphthalene-sulfonic acid radical, and B represents an alkali salt of 2-amino-naphthol-sulfonic acid radical, the said dyestuffs being dark powders, soluble in water with a coloration ranging from greenish-drab to deep brownish-black, soluble in concentrated sulfuric acid with a deep blue color and dyeing unmordanted vegetable fibers greenish to reddish drabs in light shades and deep bronze to dark reddish black in heavy shades.

2. The dyestuffs produced by diazotizing the product obtained by combining one molecule of a tetrazotized para-diamin, one molecule of salicylic acid and one molecule of alpha-naphthylamin-sulfo acid-(1:6) diazotizing the resulting product and combining said compound with one molecule of 2-amino-naphthol-sulfonic acid, the dyestuffs having most probably the formula:—

S.N:N.P.N:N.A.N:N.B in which S represents a radical of an alkali salt of salicylic acid, P represents a diaryl radical of a para-diamin, A represents an alkali salt of naphthalene-sulfonic acid radical, and B represents an alkali salt of 2-amino-naphthol-sulfonic acid radical, the said dyestuffs being dark powders, soluble in water with a coloration ranging from greenish-drab to deep brownish-black, soluble in concentrated sulfuric acid with a deep blue color, giving beta-diamino-naphthol-sulfo acids with other reduction products, and dyeing unmordanted vegetable fibers greenish to reddish drabs in light shades and deep bronze to dark reddish black in heavy shades.

Signed at Huddersfield, in the county of York, England, this 8 day of April A. D. 1913.

JOSEPH TURNER.
HARRY DEAN.

Witnesses:
FREDERICK SYKES BAINES,
HERBERT BLACKBURN